US008898958B2

(12) United States Patent
Filipczak et al.

(10) Patent No.: US 8,898,958 B2
(45) Date of Patent: Dec. 2, 2014

(54) SEALING SYSTEM FOR A FRAMELESS DOOR OF A VEHICLE

(71) Applicant: GM Global Technology Operations LLC, Detroit, MI (US)

(72) Inventors: Larry A. Filipczak, West Bloomfield, MI (US); Stephen D. Rusnak, Waterford, MI (US); Robert Conner, Lennox, MI (US); John K. Itoney, St. Clair Shores, MI (US); Michael J. Wesner, Washington, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/899,929

(22) Filed: May 22, 2013

(65) Prior Publication Data

US 2014/0196379 A1 Jul. 17, 2014

Related U.S. Application Data

(60) Provisional application No. 61/752,199, filed on Jan. 14, 2013.

(51) Int. Cl.
*B60J 5/04* (2006.01)
(52) U.S. Cl.
USPC ..... 49/502; 49/498.1; 296/146.2; 296/146.15
(58) Field of Classification Search
USPC ........ 49/502, 498.1, 495.1, 490.1; 296/146.2, 296/146.15
See application file for complete search history.

(56) References Cited

U.S. PATENT DOCUMENTS

| | | | | |
|---|---|---|---|---|
| 5,054,242 A | * | 10/1991 | Keys et al. | 49/490.1 |
| 5,548,929 A | | 8/1996 | Larsen et al. | |
| 5,555,677 A | * | 9/1996 | DeRees et al. | 49/502 |
| 5,651,578 A | | 7/1997 | Mistopoulos et al. | |
| 5,732,509 A | * | 3/1998 | Buehler et al. | 49/440 |
| 5,806,914 A | | 9/1998 | Okada | |
| 6,409,251 B1 | * | 6/2002 | Kaye et al. | 296/146.9 |
| 6,932,415 B1 | * | 8/2005 | Van Houzen et al. | 296/146.2 |
| 8,033,057 B2 | * | 10/2011 | Krause et al. | 49/441 |
| 8,434,267 B2 | * | 5/2013 | Bocutto | 49/479.1 |
| 8,459,723 B2 | * | 6/2013 | Stoll | 296/146.7 |
| 8,522,481 B2 | * | 9/2013 | Brancaleone et al. | 49/440 |
| 8,561,353 B2 | * | 10/2013 | Terai et al. | 49/502 |
| 8,579,355 B2 | * | 11/2013 | Ogawa | 296/146.9 |
| 2006/0156632 A1 | * | 7/2006 | Ruppert et al. | 49/502 |

(Continued)

FOREIGN PATENT DOCUMENTS

DE 3921760 A1 1/1991

*Primary Examiner* — Jerry Redman
(74) *Attorney, Agent, or Firm* — Quinn Law Group, PLLC

(57) ABSTRACT

A sealing system for a vehicle includes a first and second seal. The first seal is attached to a first edge of a first flange of the vehicle. The first seal presents a first outer contact surface that extends in generally parallel relationship to the first edge. The second seal is attached to a second edge of a second flange of the vehicle. The second seal presents a second outer contact surface that extends in generally parallel relationship to the second edge. The first outer contact surface and the second outer contact surface are in sealing contact relationship with the movable pane of glass when the movable pane of glass is in a closed position. The first outer contact surface and the second outer contact surface are not in sealing contact relationship with the movable pane of glass when the movable pane of glass is in an open position.

16 Claims, 3 Drawing Sheets

(56) References Cited

U.S. PATENT DOCUMENTS

| | | |
|---|---|---|
| 2009/0309391 A1 | 12/2009 | Krause |
| 2010/0001550 A1* | 1/2010 | Janisch .................. 296/146.2 |
| 2010/0064592 A1* | 3/2010 | Ohe ............................ 49/502 |
| 2011/0167732 A1* | 7/2011 | Brancaleone et al. ...... 49/475.1 |
| 2012/0159861 A1 | 6/2012 | Mori et al. |
| 2012/0234621 A1* | 9/2012 | Syvret et al. ................ 180/281 |
| 2012/0274102 A1* | 11/2012 | Ertl ............................. 296/201 |
| 2013/0076061 A1* | 3/2013 | Ogawa .................... 296/146.15 |
| 2013/0160375 A1* | 6/2013 | Kuwabara .................. 49/490.1 |

\* cited by examiner

SEALING SYSTEM FOR A FRAMELESS DOOR OF A VEHICLE

CROSS-REFERENCE TO RELATED APPLICATIONS

This application claims priority to U.S. Provisional Patent Application No. 61/752,199, filed on Jan. 14, 2013, which is hereby incorporated by reference in its entirety.

TECHNICAL FIELD

The present disclosure relates to a sealing system for a frameless door of a vehicle.

BACKGROUND

Various vehicles have doors for entering or exiting a vehicle compartment. Weather strips or trim pieces have been designed to cover edges of the doors or edges of the vehicle compartment. These weather strips or trim pieces can be visible from outside of the vehicle which can provide challenges to presenting an aesthetic appearance of the vehicles.

SUMMARY

A sealing system is provided for a vehicle. The sealing system includes a first seal and a second seal. The first seal is configured to be operatively attached to a first edge of a first flange of the vehicle. The first seal presents a first outer contact surface that is configured to extend in generally parallel relationship to the first edge. The second seal is configured to be operatively attached to a second edge of a second flange of the vehicle. The second seal presents a second outer contact surface that is configured to extend in generally parallel relationship to the second edge. The first outer contact surface of the first seal and the second outer contact surface of the second seal are configured to be in sealing contact relationship with a movable pane of glass when the movable pane of glass is in a closed position. The first outer contact surface and the second outer contact surface are configured to not be in sealing contact relationship with the movable pane of glass when the movable pane of glass is in an open position.

A vehicle includes a first flange, a second flange, a first seal, a second seal, and a pane of glass. The first flange has a first edge and the second flange has a second edge. The first edge extends in spaced relationship to the second edge. The first seal is operatively attached to the first edge. The first seal presents a first outer contact surface that extends in generally parallel relationship to the first edge. The second seal is operatively attached to the second edge of the second flange. The second seal presents a second outer contact surface that extends in generally parallel relationship to the second edge. The pane of glass is movable between an open position and a closed position. The pane of glass is in sealing contact relationship with each of the first outer contact surface of the first seal and the second outer contact surface of the second seal when the pane of glass is in the closed position. Likewise, the pane of glass is not in sealing contact relationship with any of the first outer contact surface of the first seal and the second outer contact surface of the second seal when the pane of glass is in the open position.

The above features and advantages and other features and advantages of the present disclosure are readily apparent from the following detailed description of the best modes for carrying out the disclosure when taken in connection with the accompanying drawings.

DESCRIPTION OF THE PREFERRED EMBODIMENTS

Those having ordinary skill in the art will recognize that terms such as "above," "below," "upward," "downward," "top," "bottom," "inward," "outward," etc., are used descriptively for the figures, and do not represent limitations on the scope of the invention, as defined by the appended claims.

Figure 1:
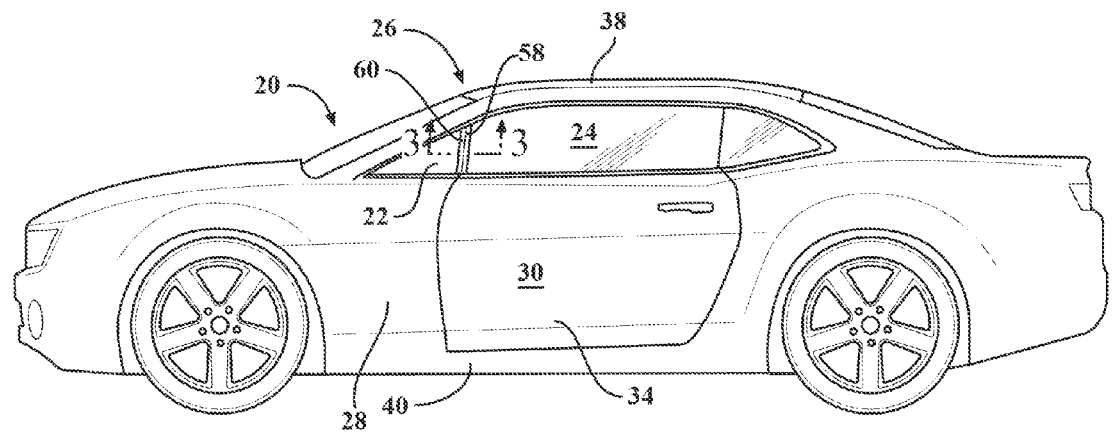
FIG. 1 is a schematic side view of a vehicle having a sealing system.

Referring to the drawings, wherein like reference numbers refer to like components, FIG. 1 shows a vehicle 20 having a fixed pane of glass 22, a movable pane of glass 24, and a sealing system 26. The sealing system 26 provides a seal between the movable pane of glass 24 and the fixed panel 22, as explained in more detail below.

The vehicle 20 includes a body 28 and a door 30. The door 30 is frameless and the movable pane of glass 24 is operatively attached to the door 30. This means that the door 30 does not include a header that surrounds the entire perimeter of movable pane of glass 24, as used in a fully framed door 30 having a header. As such, in the absence of a header, any sealing occurs between the movable pane of glass 24 and the body 28.

Figure 3:
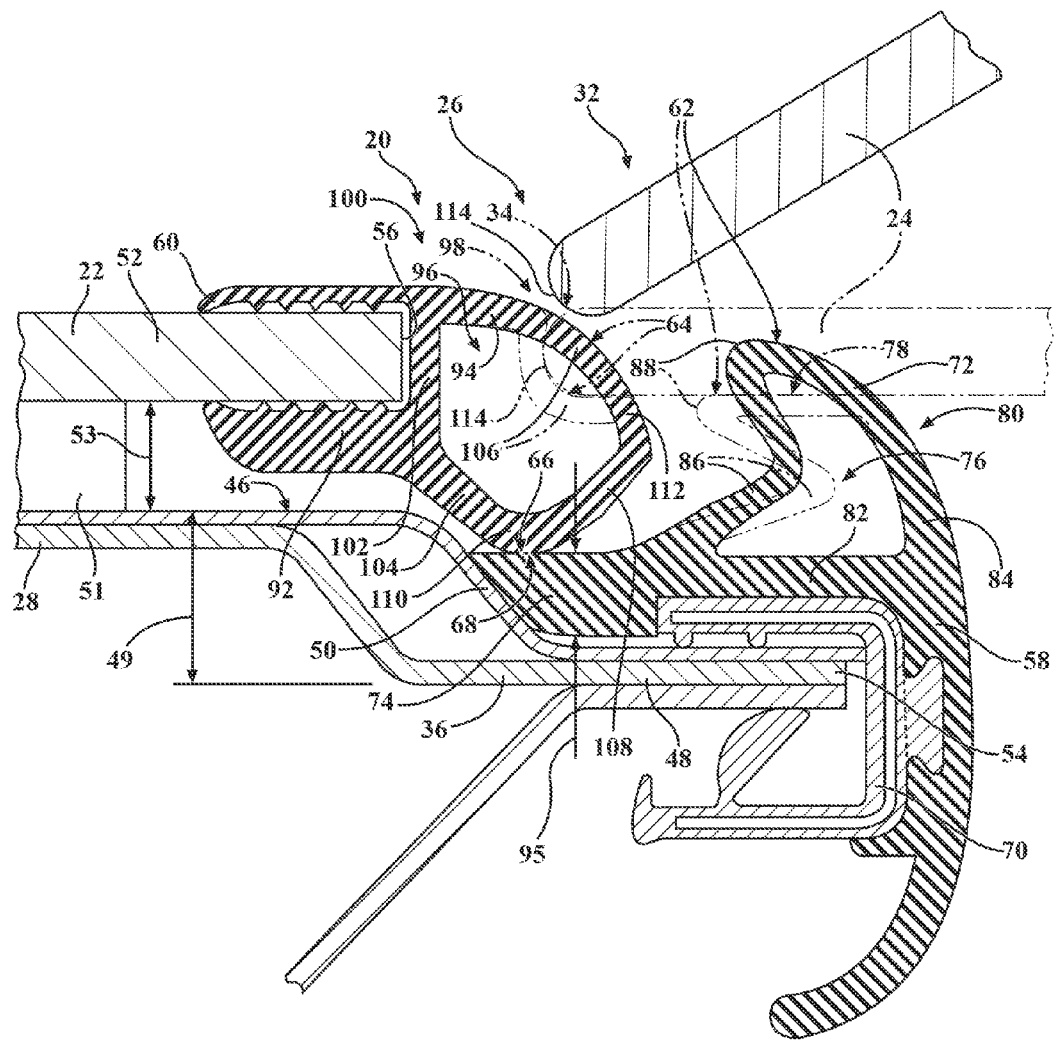
FIG. 3 is a schematic cross-sectional side view of the sealing system of the vehicle, taken along line 3-3 of FIG. 1.
Figure 4:
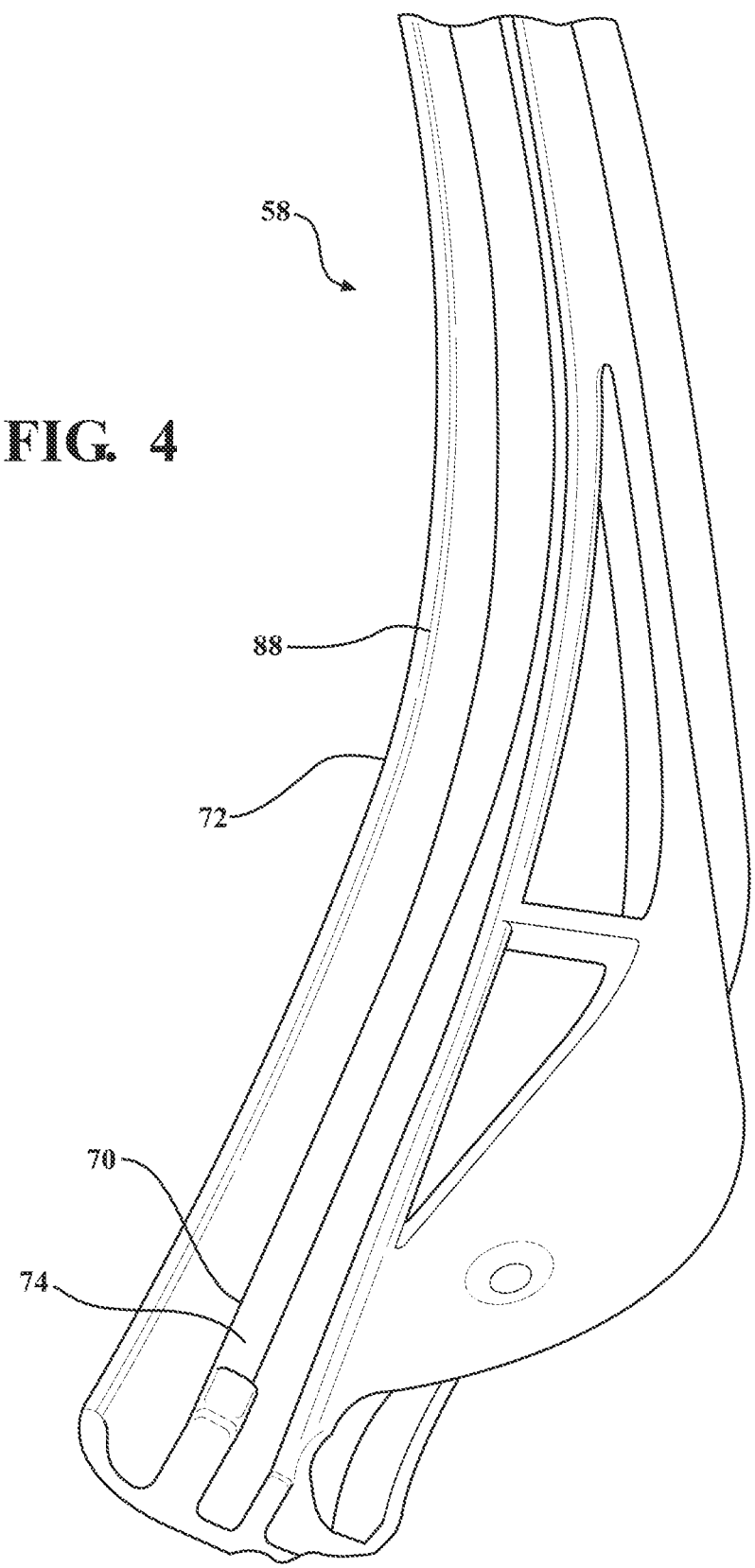
FIG. 4 is a schematic inner side view of a first seal of the sealing system of FIG. 1.

As shown in FIG. 3, the movable pane of glass 24 moves, i.e., pivots, with the door 30, relative to the body 28 and the fixed panel 22, between a first position 32, i.e., an open position, and a second position 34, i.e., a closed position, (illustrated in broken lines). The body 28 includes an A-pillar 36 extending between a roof 38 and a floor 40 of the vehicle 20. The door 30 is hingedly attached to a lower portion 42 of the A-pillar 36. An upper portion 44 of the A-pillar 36 includes a support surface 46 that supports the fixed panel 22. The upper portion 44 of the A-pillar 36 further includes a first flange 48 and an interconnecting wall 50. The interconnecting wall 50 extends a distance 49 between the first flange 48 and the support surface 46 and the fixed panel 22 is supported by the support surface 46. More specifically, the fixed pane of glass 22 may be adhered to the support surface 46 with an adhesive 51 and the like, such that a gap 53 is defined between the fixed pane of glass 22 and the support surface 46. The fixed panel 22 presents a second flange 52 that extends along the upper portion 44 of the A-pillar 36. The fixed panel 22 may be a fixed panel of glass. The second flange 52 is disposed outboard of the first flange 48.

Figure 2:
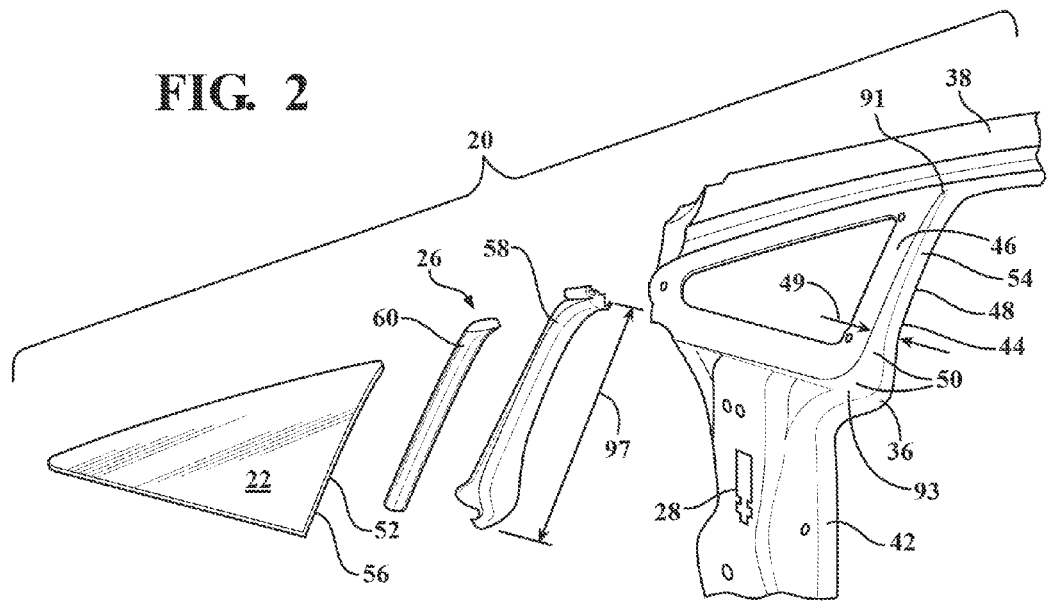
FIG. 2 is a schematic exploded view of the sealing system of FIG. 1.

Further, referring to FIG. 2, the first flange 48 extends in diverging relationship to the second flange 52 such that the interconnecting wall 50 diverges between the first flange 48 and the second flange 52. This means that the second flange 52 extends in a generally inboard direction, relative to the second flange 52, as the second flange 52 extends toward the floor 40. As such, the first flange 48 diverges inward relative to the support surface 48, such that the fixed pane of glass 22 is not parallel to the first flange 48. By way of a non-limiting example, the distance 49 may diverge by at least 16 millimeters between a tip end 90 of the upper portion 44 of the A-pillar 36 and a bottom end 93 of the upper portion 44 of the A-pillar 36. It should be appreciated that the interconnecting wall 50 may diverge by other distances as known to those of skill in the art.

The first flange 48 has a first edge 54 and the second flange 52 has a second edge 56. The first edge 54 extends in spaced relationship to the second edge 56. The sealing system 26 includes a first seal 58 and a second seal 60. The first seal 58 is operatively attached to the first edge 54 of the first flange 48 of the upper portion 44 of the A-pillar 36. The first seal 58 presents a first outer contact surface 62 that extends in generally parallel relationship to the first edge 54. The second seal 60 is operatively attached to the second edge 56 of the second flange 52 of the fixed pane of glass 22. The second seal 60 presents a second outer contact surface 64 that extends in generally parallel relationship to the second edge 56. The first and second seals 58, 60 may be formed from an elastomer, such as a rubber. More specifically, the first and second seals may be formed from a synthetic rubber, such as an ethylene-propylene-diene-monomer rubber. It should be appreciated that the first and second seals 58, 60 may include other materials, as known to those of skill in the art.

Referring again to FIG. 3, when the door 30 is in the closed position 34, the movable pane of glass 24 is in sealing contact relationship with each of the first outer contact surface 62 of the first seal 58 and the second outer contact surface 64 of the second seal 60. As such, the sealing contact relationship prevents water and/or air from entering the vehicle 20 from between the first and second seal 58, 60 and the corresponding portion of the movable pane of glass 24. Likewise, when the door 30 is in the open position 32, the movable pane of glass 24 is not in sealing contact relationship with any of the first outer contact surface 62 of the first seal 58 and the second outer contact surface 64 of the second seal 60. Therefore, the movable pane of glass 24 pivots with the door 30, about the lower portion 42 of the A-pillar 36, relative to the first and second seal 58, 60.

The first seal 58 presents a first mating surface 66 and the second seal 60 presents a second mating surface 68 that is positioned on the vehicle 20 to be opposite the second outer contact surface 64. The first seal 58 includes a first channel member 70, a first bulb 72, and a first lip 74. The first channel member 70 is operatively attached to the first edge 54 of the first flange 48. The first lip 74 presents the first mating surface 66. The first channel member 70 may be generally C-shaped. However, it should be appreciated that the first channel member 70 may have a different shape.

The first bulb 72 and the first lip 74 each extend from the first channel member 70. The first bulb 72 presents the first outer contact surface 62. The first bulb 72 is resilient and defines a first inner channel 76. The first bulb 72 collapses into a first collapsed position 78 when the movable pane of glass 24 is in the closed position 34. Likewise, the first bulb 72 uncollapses into a first uncollapsed position 80 when the movable pane of glass 24 is in the open position 32. The first bulb 72 has a first base section 82, a first arm 84, and a second arm 86. The first base section 82 extends along the first channel member 70 and the first arm 84 extends from the first base section 82. The first arm 84 and the second arm 86 intersect to form an apex 88 therebetween. As such, the first bulb 72 has a generally triangular cross-section when the movable pane of glass 24 is in the open position 32. The apex 88 collapses toward the second seal 60 when the movable pane of glass 24 is in the closed position 34.

Referring again to FIG. 3, the first lip 74 has a first thickness 95, which is less than the distance 49 between the first flange 48 and the support surface 46. The first thickness 95 varies along a length 97 of the first seal 58. In a non-limiting example, the first thickness is between 35% and 70% of the distance 49 between the first flange and the support surface 46. As such, the first thickness 95 is configured to increase or decrease as a function of the distance 49 between the first flange 48 and the support surface 46 such that the first mating surface 66 of the first lip 74 is in contact relationship with the second mating surface 68 of the second seal 60, along the length of the first seal 58, when the movable pane of glass 24 is in the closed position 34.

The second seal 60 includes a second channel member 92 and a second bulb 94. The second channel member 92 is operatively attached to the second edge 56 of the second flange 52. The second bulb 94 extends from the second channel member 92 and presents the second outer contact surface 64 and the second mating surface 68, opposite the second outer contact surface 64. The second channel member 92 may be generally C-shaped. However, it should be appreciated that the second channel member 92 may have a different shape.

The second bulb 94 is resilient and defines a second inner channel 96. The second bulb 94 collapses into a second collapsed position 98 when the movable pane of glass 24 is in the closed position 34. Likewise, the second bulb 94 uncollapses into a second uncollapsed position 100 when the movable pane of glass 24 is in the open position 32.

The second bulb 94 has a second base section 102, an inner side 104, an outer side 106, and a middle side 108. The inner side 104 and the outer side 106 extend from the second base section 102 in spaced relationship to one another. The outer side 106 presents the second outer contact surface 64. The middle side 108 extends between the inner side 104 and the outer side 106. The inner side 104 and the middle side 108 intersect to form a first corner 110 therebetween. The first corner 110 presents the second mating surface 68. The outer side 106 and the middle side 108 intersect to form a second corner 112 therebetween. When the movable pane of glass 24 is pivoted from the open position 32 to the closed position 34, an edge 114 of the movable pane of glass 24 contacts the outer side 106 at the outer contact surface when the movable pane of glass 24 is in the closed position 34, causing the outer side 106 to collapse about the second corner 112 when the movable pane of glass 24 is in the closed position 34. As such, the outer side 106 collapses away from the apex 88 of the first seal 58.

When the movable pane of glass 24 is in the closed position 34, the first and second collapsed positions 78, 98 of the first and second seals 58, 60 provide a seal between the movable pane of glass 24 and the first and second seals 58, 60. Further, a flush glass appearance is achieved between the movable pane of glass 24 and the fixed pane of glass 22.

While the best modes for carrying out the disclosure have been described in detail, those familiar with the art to which this disclosure relates will recognize various alternative designs and embodiments for practicing the disclosure within the scope of the appended claims.

The invention claimed is:

1. A sealing system for a vehicle having a pane of glass movable between a first position and a second position, the sealing system comprising:
   a first seal configured to be operatively attached to a first edge of the vehicle, the first seal presenting a first outer contact surface configured to extend in generally parallel relationship to the first edge; and
   a second seal configured to be operatively attached to a second edge of the vehicle, the second seal presenting a second outer contact surface configured to extend in generally parallel relationship to the second edge;

wherein the first seal presents a first mating surface and the second seal presents a second mating surface, opposite the second outer contact surface;

wherein the second mating surface is configured to be in continuous sealing contact relationship with the first mating surface when the first and second seals are attached to the respective first and second edges;

wherein the first seal includes:
  a first channel member configured to be operatively attached to the first edge;
  a first bulb extending from the first channel member, the first bulb presenting the first outer contact surface; and
  a first lip extending from the first channel member, the first lip presenting the first mating surface;

wherein the first outer contact surface of the first seal and the second outer contact surface of the second seal are configured to be in sealing contact relationship with the pane of glass when the pane of glass is in the second position; and wherein the first outer contact surface and the second outer contact surface are configured to not be in sealing contact relationship with the pane of glass when the pane of glass is in the first position.

2. A sealing system, as set forth in claim 1, wherein the first bulb is resilient and defines a first inner channel;
  wherein the first bulb is configured to collapse into a first collapsed position when the movable pane of glass is in the second position and the first bulb is configured to uncollapse into a first uncollapsed position when the movable pane of glass is in the first position.

3. A sealing system, as set forth in claim 2, the first bulb having:
  a first base section extending along the first channel member;
  a first arm extending from the base section; and
  a second arm extending from the base section;
  wherein the first arm and the second arm intersect to form an apex therebetween such that the first bulb has a generally triangular cross-section when the first bulb is in the uncollapsed position.

4. A sealing system, as set forth in claim 3, wherein the apex is configured to collapse toward the second seal when the pane of glass is in the second position.

5. A sealing system, as set forth in claim 1, and the first lip having a first thickness;
  wherein the first thickness varies along a length of the first seal.

6. A sealing system, as set forth in claim 1, wherein the second seal includes:
  a second channel member configured to be operatively attached to the second edge; and
  a second bulb extending from the second channel member, the second bulb presenting the second outer contact surface and the second mating surface, opposite the second outer contact surface.

7. A sealing system, as set forth in claim 6, wherein the second bulb is resilient and defines a second inner channel; and
  wherein the second bulb is configured to collapse into a second collapsed position when the pane of glass is in the second position and the second bulb is configured to uncollapse into a second uncollapsed position when the pane of glass is in the first position.

8. A sealing system, as set forth in claim 7, the second bulb having:
  a second base section;
  an inner side and an outer side extending from the second base section in spaced relationship to one another;
  wherein the outer side presents the second outer contact surface; and
  a middle side extending between the inner side and the outer side;
  wherein the inner side and the middle side intersect to form a first corner therebetween, the first corner presenting the second mating surface; and
  wherein the outer side and the middle side intersect to form a second corner therebetween.

9. A sealing system, as set forth in claim 8, wherein the outer side is configured to collapse about the second corner when the pane of glass is in the second position.

10. A vehicle comprising:
  a first flange having a first edge and a second flange having a second edge, wherein the first edge extends in spaced relationship to the second edge;
  a first seal operatively attached to the first edge, the first seal presenting a first outer contact surface extending in generally parallel relationship to the first edge;
  a second seal operatively attached to the second edge of the second flange, the second seal presenting a second outer contact surface extending in generally parallel relationship to the second edge;
  a pane of glass movable between an open position and a closed position;
  wherein the first seal presents a first mating surface and the second seal presents a second mating surface, opposite the second outer contact surface;
  wherein the second mating surface is in continuous sealing contact relationship with the first mating surface;
  wherein the first seal includes:
    a first channel member operatively attached to the first edge of the first flange;
    a first bulb extending from the first channel member, the first bulb presenting the first outer contact surface; and
    a first lip extending from the first channel member, the first lip presenting the first mating surface;
  wherein the first bulb is resilient and defines a first inner channel;
  wherein the first bulb collapses into a first collapsed position when the pane of glass is in the closed position and the first bulb uncollapses into a first uncollapsed position when the pane of glass is in the open position;
  wherein the pane of glass is in sealing contact relationship with each of the first outer contact surface of the first seal and the second outer contact surface of the second seal when the pane of glass is in the closed position; and
  wherein the pane of glass is not in sealing contact relationship with any of the first outer contact surface of the first seal and the second outer contact surface of the second seal when the pane of glass is in the open position.

11. A vehicle, as set forth in claim 10, the first bulb having:
  a first base section extending along the first channel member;
  a first arm extending from the base section; and
  a second arm extending from the base section;
  wherein the first arm and the second arm intersect to form an apex therebetween such that the first bulb has a generally triangular cross-section when the pane of glass is in the open position.

12. A vehicle, as set forth in claim 11, wherein the apex collapses toward the second seal when the pane of glass is in the closed position.

13. A vehicle, as set forth in claim 10, further comprising an interconnecting wall extending between the first flange and the second flange such that the second flange is disposed outboard of the first flange;
- wherein the first flange extends in diverging relationship to the second flange such that the interconnecting wall diverges between the first flange and the second flange;
- wherein the first lip of the first seal has a first thickness; and
- wherein the thickness increases along a length of the first seal such that the first mating surface of the first seal is in contact relationship with the second mating surface of the second seal when the panel of glass is in the closed position.

14. A vehicle, as set forth in claim 10, wherein the second seal includes:
- a second channel member operatively attached to the second edge of the second flange; and
- a second bulb extending from the second channel member, the second bulb presenting the second outer contact surface and the second mating surface, opposite the second outer contact surface.

15. A vehicle, as set forth in claim 14, wherein the second bulb is resilient and defines a second inner channel; and
- wherein the second bulb collapses into a second collapsed position when the pane of glass is in the closed position and the second bulb uncollapses into a second uncollapsed position when the pane of glass is in the open position.

16. A vehicle, as set forth in claim 15, the second bulb having:
- a second base section;
- an inner side and an outer side extending from the second base section in spaced relationship to one another;
- wherein the outer side presents the second outer contact surface; and
- a middle side extending between the inner side and the outer side;
- wherein the inner side and the middle side intersect to form a first corner therebetween, the first corner presenting the second mating surface;
- wherein the outer side and the middle side intersect to form a second corner therebetween; and
- wherein the outer side collapses about the second corner when the pane of glass is in the closed position.

* * * * *